United States Patent
Jobst et al.

(10) Patent No.: US 10,259,315 B2
(45) Date of Patent: Apr. 16, 2019

(54) CHARGING CONNECTOR DEVICE FOR A MOTOR VEHICLE

(71) Applicant: AUDI AG, Ingolstadt (DE)

(72) Inventors: Thomas Jobst, Stammham (DE); Jaume Sanchez, Nassenfels (DE); Michael Kauselmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/848,066

(22) Filed: Dec. 20, 2017

(65) Prior Publication Data

US 2018/0215254 A1    Aug. 2, 2018

(30) Foreign Application Priority Data

Jan. 27, 2017    (DE) .................. 10 2017 201 365

(51) Int. Cl.
*H02G 3/14* (2006.01)
*B60K 15/05* (2006.01)
(Continued)

(52) U.S. Cl.
CPC .......... *B60K 15/05* (2013.01); *B60L 11/1818* (2013.01); *H01R 13/447* (2013.01); *H01R 13/5213* (2013.01); *H01R 13/6397* (2013.01); *B60K 2015/0422* (2013.01); *B60K 2015/0435* (2013.01); *B60K 2015/053* (2013.01); *B60K 2015/0538* (2013.01);
(Continued)

(58) Field of Classification Search
CPC . H02G 3/14; H02G 3/08; H02G 3/081; H01R 13/447; H01R 13/5213; H01R 13/6397; H01R 2201/26; H01R 13/453; B60L 11/1818; E05Y 2900/534

USPC ..... 174/66, 67, 50, 520; 220/241, 242, 4.02; 439/142, 135, 136, 137, 138
See application file for complete search history.

(56) References Cited

U.S. PATENT DOCUMENTS 5,501,607 A * 3/1996 Yoshioka ................. B60K 1/04
439/142
5,580,258 A * 12/1996 Wakata ............... B60L 11/1818
439/142
(Continued)

FOREIGN PATENT DOCUMENTS

DE         2329015 A1    1/1975
DE         4022116 C1    9/1991
(Continued)

OTHER PUBLICATIONS

German Search Report dated Aug. 8, 2017 of corresponding German application No. 102017201365.6; 7 pgs.

*Primary Examiner* — Angel R Estrada
(74) *Attorney, Agent, or Firm* — Maier & Maier, PLLC

(57) ABSTRACT

A charging connector device for a motor vehicle. A connector socket, which is arranged in a depression, with a pivotable cover, which can be detachably connected to said connector socket, as well as a pivotable cover flap, which closes the depression reversibly. The cover and the cover flap can pivot between a closed position and an opened position. The cover, situated in the opened position, is arranged in the pivoting path of the cover flap, which can pivot from the opened position to the closed position by a motor-driven positioning device, and, during the pivot movement of the cover flap, is entrained by the latter for closure.

5 Claims, 4 Drawing Sheets

(51) Int. Cl.
*B60L 11/18* (2006.01)
*H01R 13/447* (2006.01)
*H01R 13/52* (2006.01)
*H01R 13/639* (2006.01)
*B60K 15/04* (2006.01)

(52) U.S. Cl.
CPC . *B60K 2015/0553* (2013.01); *E05Y 2900/534* (2013.01); *H01R 2201/26* (2013.01); *H02G 3/14* (2013.01)

(56) References Cited

U.S. PATENT DOCUMENTS

| | | | | |
|---|---|---|---|---|
| 8,961,204 | B2* | 2/2015 | Hara | B60L 11/1818 |
| | | | | 439/142 |
| 9,579,985 | B2* | 2/2017 | Lacour | B60L 11/1818 |

FOREIGN PATENT DOCUMENTS

| | | |
|---|---|---|
| DE | 4416992 A1 | 11/1994 |
| DE | 19845088 A1 | 4/2000 |
| DE | 69421754 T2 | 6/2000 |
| DE | 29904804 U1 | 7/2000 |
| DE | 60107305 T2 | 12/2005 |
| DE | 112011103303 T5 | 8/2013 |
| DE | 102015100136 A1 | 7/2016 |
| EP | 2586688 A1 | 5/2013 |

* cited by examiner

CHARGING CONNECTOR DEVICE FOR A MOTOR VEHICLE

FIELD

The invention relates to a charging connector device for a motor vehicle, comprising a connector socket arranged in a depression with a pivotable cover that can be detachably connected to it as well as a pivotable cover flap that reversibly closes the depression, wherein the cover and the cover flap can pivot between a closed position and an opened position.

BACKGROUND

A charging connector device of this kind is employed in modern motor vehicles in the form of electric or hybrid vehicles. It serves for connecting a charging cable to the connector socket in order to be able to charge the energy storage unit installed on the side of the vehicle. Such a charging connector device, as is known from DE 44 16 992 A1 or EP 2 586 688 A1, for example, comprises a connector socket, such as, for example, a CCS charging socket, which is arranged in a depression which is formed by a corresponding component that is designed as part of a charging connector device. Associated with said socket is a pivotable cover, with which the connector socket can be closed in order to protect the connector socket against soiling or the entry of moisture. Further provided is a pivotable cover flap that reversibly closes the depression and virtually covers the charging connector device outwardly. Such a charging connector device is employed, for example, in passenger vehicles, primarily in the region of the vehicle's exterior, with the cover flap forming a part of the external side of the vehicle.

The cover as well as the cover flap are arranged pivotably, as described above; they can pivot between a closed position, in which the cover closes the connector socket and the cover flap closes the depression, and an opened position, in which both of them are pivoted out and consequently opened.

After termination of the charging operation, the user initially has to withdraw the charging plug from the connector socket, after which the user manually closes the cover, that is, pivots it into the closed position and adequately fixes it in place at the connector socket by pressing on it. Subsequently, in the next step, the user closes the cover flap in order to close the depression, that is, to close the charging connector device as such. This is awkward.

SUMMARY

The invention is therefore based on the object of presenting a charging connector device that is improved over the prior art and makes possible a simpler closing.

To achieve this object, it is provided in accordance with the invention that, for a charging connector device of the kind mentioned in the beginning, the cover, which is situated in the opened position, is arranged in the pivoting path of the cover flap, which can pivot from the opened position to the closed position by means of a motor-driven positioning means and, during the pivoting movement of the cover flap, is entrained by the latter for closure.

For the charging connector device according to the invention, a coupled movement of the cover and the cover flap is provided in such a way, that, when the cover flap pivots from the opened position to the closed position, the cover flap virtually runs against the cover and entrains it for closure. The movement of the cover flap occurs, moreover, by means of a motor-driven positioning element, preferably an electric motor, which is correspondingly actuated via a control device; this can occur, for example, in that the user presses a button or the like, which results in initiation of the closing operation. As a result of the coupled movement and the use of a motor-driven positioning device, manual actions on the part of the user are no longer required. Namely, the closing operation is effected or initiated via the electric motor-driven positioning device and the coupled movement ensures that, in spite of the coupling of the motor-driven positioning device, the cover, too, is exclusively entrained together with the cover flap, that is, is automatically moved and brought into the closed position. For the user, this means that there is a high degree of simplicity, security, and comfort.

In accordance with a first embodiment of the invention, the cover can hereby be moved via the cover flap all the way to the closed position. In this case, therefore, the cover flap runs against the cover during closure and entrains it. The coupled movement or the utilization of the cover flap and cover is hereby chosen in such a way that the cover flap entrains or moves the cover all the way to the closed position, while, at the same time, the cover flap also virtually assumes the closed position.

Alternatively, it can be provided that the cover is coupled to a return element that pretensions it in the closed position and, during the movement, is carried from the closed position to the opened position over a dead center, with the cover flap entraining the cover during closure all the way over the dead center, after which the cover automatically snaps into the closed position via the return element. In this case, the cover flap entrains the cover only over a part of the movement path of the cover from the opened position to the closed position. It carries the cover solely over the dead center of the pivot path of the cover. The cover itself is pretensioned via a return element. This return element is automatically further tensioned when the cover is moved from the closed position to the opened position, whereby, during this movement, the cover is carried over the dead center. It is fixed in place beyond the dead center. If the cover flap then runs against the cover when the motor-driven positioning device is actuated, the cover is entrained and carried over the dead center. Immediately afterwards, an automatic closing mechanism of the cover is engaged via the pretensioned return element; this means that the return element then pulls the cover directly into the closed position, and the cover therefore snaps in place. In the process, it detaches from the cover flap, which further continues its closing path to the closed position, moved via the motor-driven positioning device.

The return element itself is preferably a spring, in particular a coil spring, which is fixed in place in an appropriate way, with one end being fixed in position and with the other end being joined to the cover.

Furthermore, the cover and the cover flap are preferably arranged in a pivotable manner at a common component that defines the depression, so that a compact structure, which requires relatively few parts, is obtained. Alternatively, the cover can also be arranged pivotably at the connector socket, while the cover flap is arranged at the component that defines the depression. Both the cover and the cover flap are themselves assigned movement limits, which define the opened position and limit the path of movement in them.

Besides the charging connector device itself, the invention further relates to a motor vehicle, comprising a charging connector device of the kind described.

Preferably, the charging connector device is arranged in the region of the exterior of the motor vehicle; that is, it is accessible from the outside, with the cover flap forming a part of the exterior of the vehicle. Alternatively, it is clearly also conceivable to arrange the charging connector device in the interior of the vehicle—for example, in the luggage compartment.

BRIEF DESCRIPTION OF THE FIGURES

Further advantages and details of the invention ensue from the exemplary embodiments described below as well as on the basis of the drawings.

DETAILED DESCRIPTION OF THE FIGURES

Figure 1:
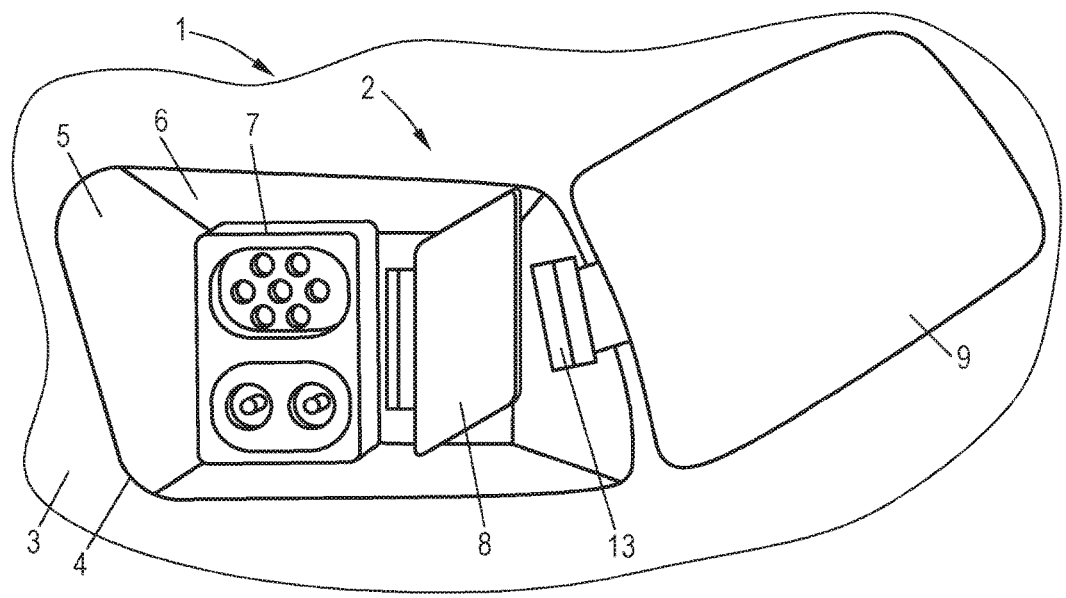
FIG. 1 a schematic illustration in a partial view of a motor vehicle according to the invention with a charging connector device according to the invention, FIG. 2 a schematic illustration of the charging device from FIG. 1 in accordance with a first embodiment with a cover flap and cover situated in the opened position, FIG. 3 an illustration corresponding to FIG. 2 during the closing operation, FIG. 4 the charging connector device from FIG. 3 in a closed state, FIG. 5 a schematic illustration of a charging connector device of a second embodiment with an opened cover flap and cover, FIG. 6 an illustration of the charging connector device during the closing operation, FIG. 7 an illustration continuing the closing operation of the charging connector device from FIG. 6, and FIG. 8 the charging connector device from FIG. 7 in a closed state.

FIG. 1 shows a schematic illustration of a partial view of a motor vehicle 1 according to the invention in the form of a passenger car, comprising a charging connector device 2 according to the invention, which, for example, is inserted into a recess 4, which is introduced on the vehicle exterior 3 of the vehicle body. The charging connector device 1 has a device component 5, which creates or defines a depression 6. Positioned at the bottom of the depression is a connector socket 7, such as, for example, a CCS charging socket, which is connected to an energy storage unit installed in the vehicle in an appropriate way.

The connector socket 7 is associated with a cover 8, which is arranged pivotably at the component 5 and serves for tight covering of the connector socket 7. Alternatively, the cover 8 can also be mounted pivotably at the connector socket 7 itself.

Further provided is a cover flap 9, which is likewise arranged pivotably at the component 5 in the example shown and serves for covering the depression 6, that is, for closing the opening 4 and, in consequence thereof, closing the vehicle external side 3. The cover 8 as well as the cover flap 9 are shown in the example here in the opened position.

Figure 2:
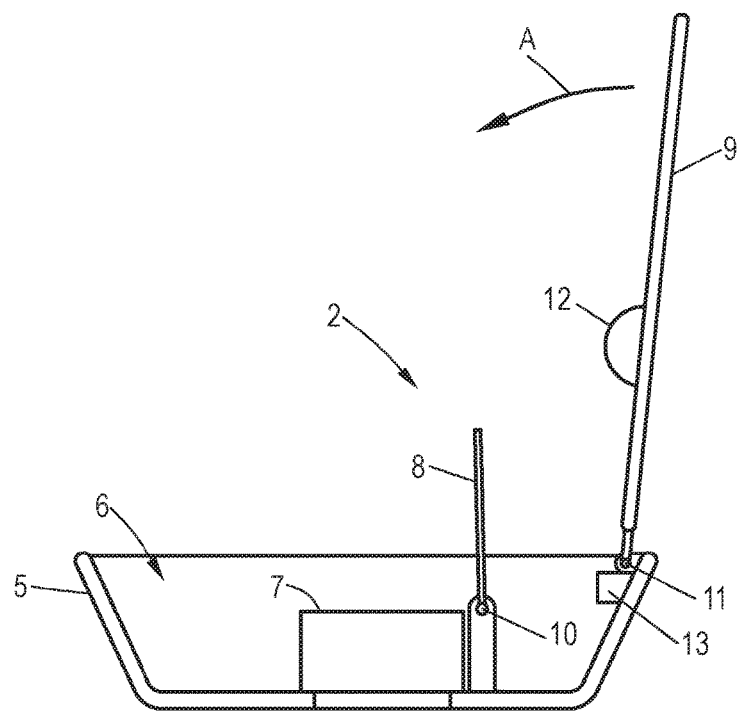
Figure 3:
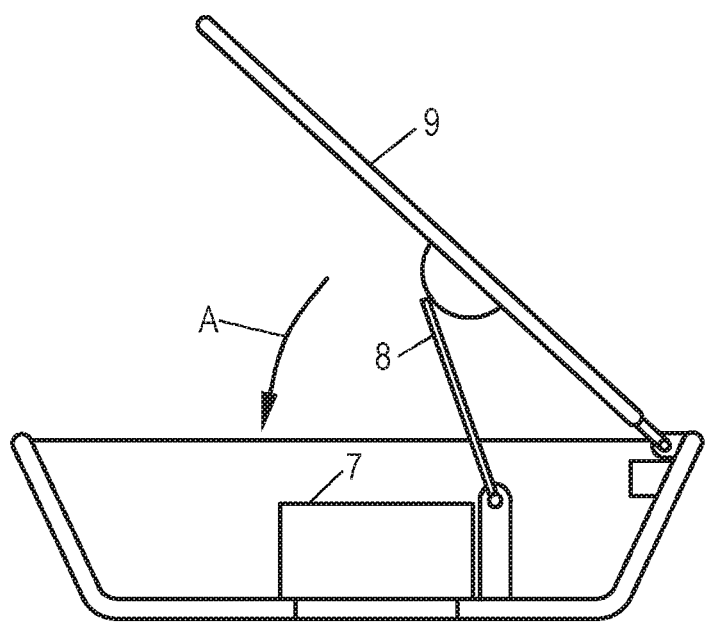
Figure 4:
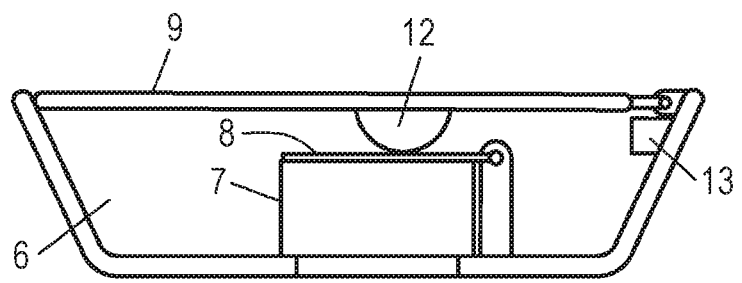

FIGS. 2-4 show a charging connector device 2 of the first embodiment according to the invention in the form of schematic illustrations, on the basis of which the closing operation will be explained.

Shown is the component 5 as well as the depression 6, in which the connector socket 7 is arranged, with additional components, such as wiring, etc., which are not shown in more detail.

Further shown is the cover 8, which can pivot around a pivot axis 10. In the case of a direct pivotable mounting of the cover 8 at the connector socket, the pivot axis 10 would be provided at the connector socket itself. Also shown is the cover flap 9, which can pivot around a pivot axis 11. Provided at the cover flap 9 on the inner side is an entraining element 12, which runs against the cover 8 during the closing operation of the cover flap 9 and entrains said cover.

Starting from FIG. 2, as indicated by the arrow A, the charging connector device 2 is to be closed after conclusion of the closing operation and withdrawal of the charging plug, which is no longer shown here; that is, both the cover 8 and the cover flap 9 are to be closed. The closing operation of the cover flap 9 occurs here automatically by means of a motor-driven positioning device 13—here in the form of an electric motor—which is coupled to the cover flap 9 or acts on its pivot axis 11.

If, after conclusion of the charging operation, the charging connector device 2 is then to be closed, the user presses an operating button, which is not shown here in more detail—at the user's vehicle key or in the region of the charging connector device itself, for example—in order to actuate the motor-driven positioning device 13 via a control device, which is not shown here in more detail. Also conceivable would be to detect the withdrawal of the charging plug and, after expiration of a predetermined time, to actuate the motor-driven positioning device automatically via a control device in order to close the charging device 2.

If the positioning device 13 is actuated, it pivots in the direction of the arrow A. Situated in the pivoting path of the cover flap 9 (see FIG. 3) is the cover 8. The cover flap 9 runs, together with the entraining element 12, against the cover 8; that is, said cover is coupled to the movement. As the pivot movement of the cover flap 9 continues, the cover 8 is then forcibly entrained and carried in the direction of the connector socket 7. The pivot movement occurs until the cover flap 9 and, together with it, the cover 8 reach the closed position shown in FIG. 4. In this position, the cover 8 lies firmly and tightly against the connector socket 7. It is pressed against the latter by the entraining element 12. The cover 9 closes the charging connector device 1 or the depression 6, so that the vehicle external side is closed.

For opening, the cover flap 9 needs either to be opened manually or, if appropriate, also opened via the motor-driven positioning device 13. In any case, the cover 8 needs to be opened manually.

Figure 5:
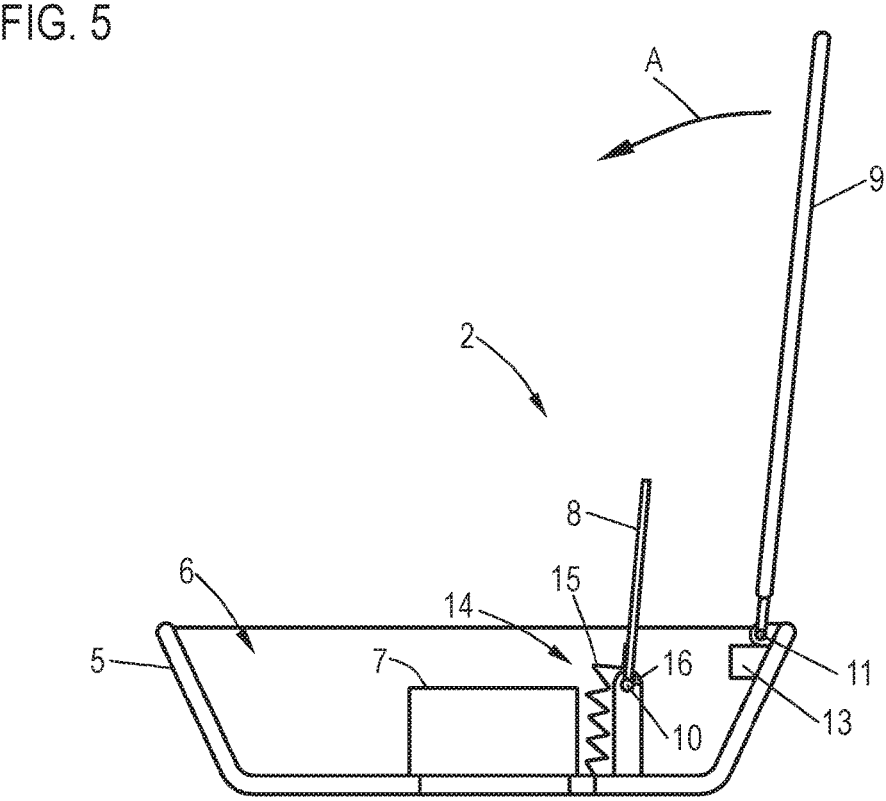

FIG. 5 shows an exemplary embodiment of a charging connector device 2 of a second embodiment according to the invention. This embodiment corresponds essentially to the embodiment in accordance with FIGS. 2-3. In this case, however, the cover 8, which is also mounted here so as to be able to pivot around the pivot axis 10, is coupled to a return element 14, for example, in the form of a spring or a coil spring 15. The return element 14 or the coil spring 15 is fastened with one end at the component 5 in the example shown and with the other end at the cover 8. In the opened position shown, the cover 8 is somewhat pivoted out over its dead center, in which, in the example shown, it would be positioned vertically and run against a stop 16, which defines the opened position. In this position, the spring 15 is tensioned. In this case, too, the cover 8 can be mounted in a pivotable manner via the pivot axis 10 directly at the connector socket 7. In this case, the return element 14 would be fastened at the connector socket 7 or integrated in it, for example.

The cover flap 9 is likewise shown in the opened position; here, too, it can pivot around the pivot axis 11, and in this case also, a motor-driven positioning device 13 is provided for movement of said cover flap.

Figure 6:
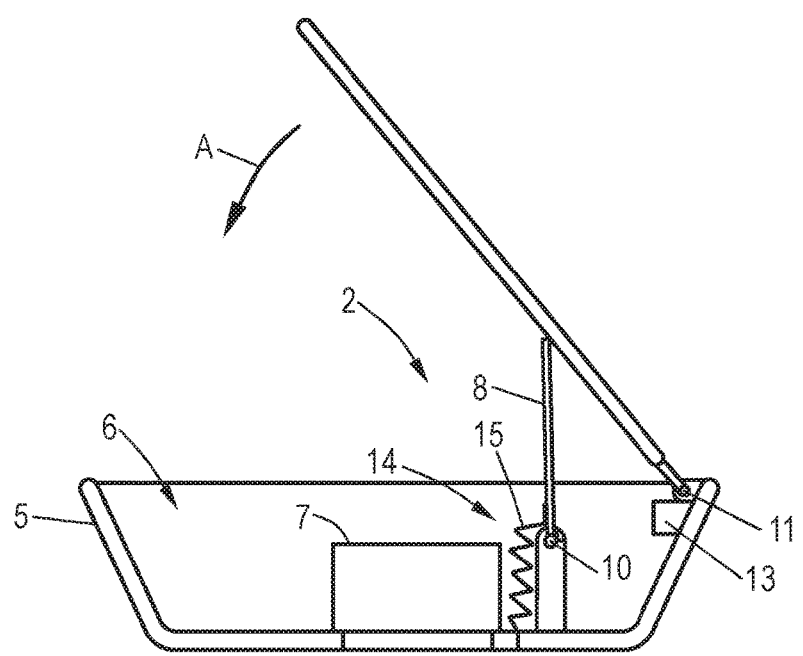
Figure 7:
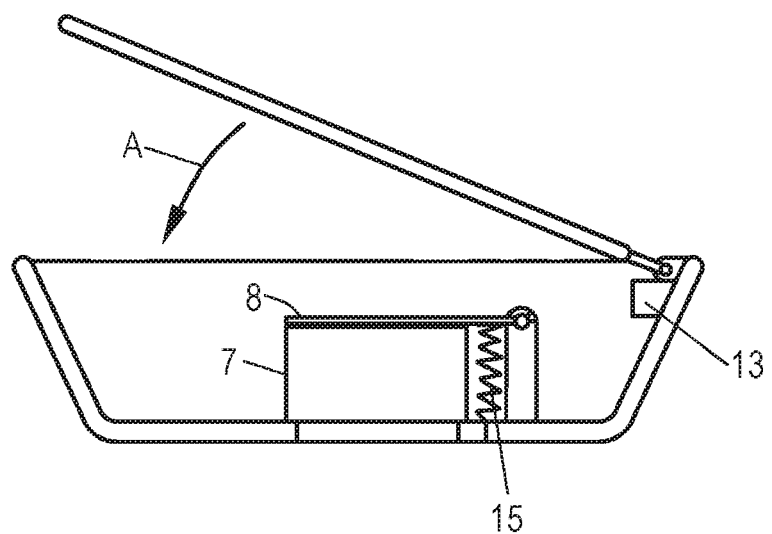
Figure 8:
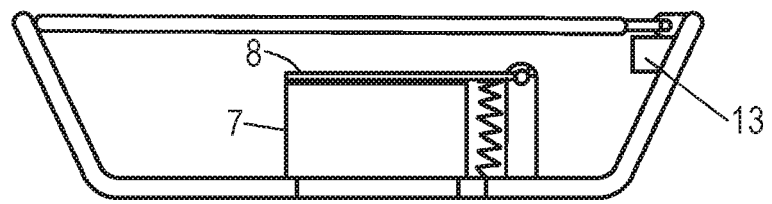

If the charging connector device 2 is then to be closed, the cover flap 9 is pivoted in the direction of the arrow A through operation of the motor-driven positioning device 13. In this case, too, the cover 8 is situated in the pivoting path of the cover flap 9. The latter runs against the cover 8 (see FIG. 6) and therefore entrains it. During further pivoting, said cover flap carries said cover to the top dead center, as shown in FIG. 6. If the cover flap 9 is pivoted further, then the cover 8 is moved outward over the dead center. Immediately after pivoting over the dead center, the cover 8 snaps via the return element 14, that is, is actively pulled via the coil spring 15, to the closed position shown in FIG. 7. In this case, the cover 8 is therefore entrained over only a part of its closing path by the cover flap 9, until it is just over the dead center, after which it snaps into position automatically via the coil spring 15. The cover flap 9 itself is not yet situated in the closed position (see FIG. 7). However, it is subsequently brought into this position via the motor-driven positioning device 13 through continuation of the closing movement. In the closed position (see FIG. 8), the connector socket 7 as well as the depression 6 are, in turn, closed.

For opening, it is possible in this case also to move the cover flap 9 manually to the opened position; alternatively to this, it is also possible to use the motor-driven positioning device 13, that is, the electric motor, for which purpose the latter needs to be actuated correspondingly through operation of a control element or the like.

In any case, the cover 8, on its part, needs to be opened manually. It is to be pivoted to the opened position against the return force of the coil spring 15, that is, pivoted somewhat beyond the dead center to the position shown in FIG. 5. In this position, it is likewise securely held by the return element 14 or the coil spring 15 until it is moved out of it via the cover flap 9 during the renewed closing operation.

The invention claimed is:

1. A charging connector device for a motor vehicle, comprising:
    a connector socket, which is arranged in a depression, with a pivotable cover, which can be detachably connected to said connector socket, as well as a pivotable cover flap, which closes the depression reversibly, wherein the cover and the cover flap can pivot between a closed position and an opened position, wherein the cover, situated in the opened position, is arranged in the pivoting path of the cover flap, which can pivot from the opened position to the closed position by a motor-driven positioning device, and, during the pivot movement of the cover flap, is entrained by the latter for closure, and
    wherein the cover is coupled to a return element, the return element is a coil spring, a first end of the return element is fastened at the cover, and a second end of the return element is fastened at the depression.

2. The charging connector device according to claim 1, wherein the cover can move via the cover flap to its closed position.

3. The charging connector device according to claim 1, wherein the return element pretensions it in the closed position and, during the movement from the closed position to the opened position, is carried over a dead center, wherein the cover flap entrains the cover during closure up to beyond the dead center, after which the cover snaps automatically into the closed position via the return element.

4. The charging connector device according to claim 1, wherein the cover and the cover flap are arranged pivotably at a common component, which defines the depression.

5. The charging connector device according to claim 4, wherein the cover is arranged pivotably at the connector socket and the cover flap is arranged pivotably at the component that defines the depression.

* * * * *